US012523531B2

(12) United States Patent
Ostrowski et al.

(10) Patent No.: US 12,523,531 B2
(45) Date of Patent: Jan. 13, 2026

(54) SYSTEM FOR MONITORING A DEVICE

(71) Applicant: ABB Schweiz AG, Baden (CH)

(72) Inventors: Joerg Ostrowski, Zurich (CH); Patrik Reto Kaufmann, Baden (CH); Stephan Wildermuth, Laudenbach (DE); Ralf Gitzel, Manheim (DE); Kai Koenig, Walldorf (DE); Joerg Gebhardt, Mainz (DE); Boguslaw Samul, Cracow (PL)

(73) Assignee: ABB Schweiz AG, Baden (CH)

( * ) Notice: Subject to any disclaimer, the term of this patent is extended or adjusted under 35 U.S.C. 154(b) by 715 days.

(21) Appl. No.: 17/863,797

(22) Filed: Jul. 13, 2022

(65) Prior Publication Data
US 2023/0014691 A1    Jan. 19, 2023

(30) Foreign Application Priority Data

Jul. 14, 2021    (EP) .................................... 21185574

(51) Int. Cl.
*G01J 5/00* (2022.01)
*G01J 5/08* (2022.01)
(Continued)

(52) U.S. Cl.
CPC ........... *G01J 5/0066* (2013.01); *G01J 5/0859* (2013.01); *G01R 19/0092* (2013.01); *G01R 31/327* (2013.01); *G01J 2005/0077* (2013.01)

(58) Field of Classification Search
CPC ................. G01J 5/0066; G01J 5/0859; G01J 2005/0077; G01R 19/0092; G01R 31/327
See application file for complete search history.

(56) References Cited

U.S. PATENT DOCUMENTS

| 6,567,814 B1 * | 5/2003 | Bankier .............. G06F 16/2465 |
| 8,742,347 B2 * | 6/2014 | Altmann .................. G01N 1/00 250/332 |
| 9,025,020 B2 * | 5/2015 | Deslandes ............ G01R 31/311 348/92 |

(Continued)

FOREIGN PATENT DOCUMENTS

| CN | 102788645 A | 11/2012 |
| CN | 103226731 A | 7/2013 |

(Continued)

OTHER PUBLICATIONS

Computer translation of WO 2019-161849 downloaded May 9, 2025.*

(Continued)

*Primary Examiner* — Randy W Gibson
(74) *Attorney, Agent, or Firm* — Fitch Even Tabin & Flannery LLP

(57) ABSTRACT

A system and method for monitoring a device includes a temperature sensor, a processing unit, and an output unit. The temperature sensor acquires a temperature measurement during a heat-up phase of a component and provides a temperature measurement to the processing unit, which selects a simulated transient temperature distribution of the simulated component of the simulated device from a plurality of simulated transient temperature distributions of the simulated component of the simulated device. The selection comprises a comparison of the at least one temperature measurement with the plurality of simulated transient temperature distributions at an equivalent time point in the simulated heat-up to a time point at which the temperature measurement was acquired. When a hot spot is developing an output unit outputs an indication of a fault associated with the component.

12 Claims, 2 Drawing Sheets

(51) Int. Cl.
*G01R 19/00* (2006.01)
*G01R 31/327* (2006.01)

(56) References Cited

U.S. PATENT DOCUMENTS

| | | | |
|---|---|---|---|
| 9,098,892 B2* | 8/2015 | Deslandes | H04N 23/23 |
| 9,322,715 B2* | 4/2016 | Altmann | G01J 5/0066 |
| 9,569,397 B2 | 2/2017 | Higgins et al. | |
| 9,734,572 B2 | 8/2017 | Tien et al. | |
| 2014/0145849 A1 | 5/2014 | Huang et al. | |
| 2018/0283815 A1* | 10/2018 | Victor | F28F 19/00 |
| 2018/0336494 A1 | 11/2018 | Wagstaff | |
| 2021/0181029 A1 | 6/2021 | Youssef et al. | |
| 2023/0026139 A1* | 1/2023 | Ostrowski | G01K 7/427 |
| 2023/0228625 A1* | 7/2023 | Gitzel | G01J 5/0096 374/121 |
| 2023/0273069 A1* | 8/2023 | Gitzel | G06T 7/0002 382/156 |
| 2023/0342906 A1* | 10/2023 | Gitzel | G06V 10/56 |

FOREIGN PATENT DOCUMENTS

| | | | | |
|---|---|---|---|---|
| CN | 104793072 A | 7/2015 | | |
| CN | 204461610 U | 7/2015 | | |
| CN | 204461613 U | 7/2015 | | |
| CN | 108234588 A | 6/2018 | | |
| CN | 109256747 A | 1/2019 | | |
| CN | 109916810 A | 6/2019 | | |
| EP | 0342597 A2 | 11/1989 | | |
| EP | 1918698 A1 | 5/2008 | | |
| EP | 3 671 997 | * | 6/2020 | H02B 13/066 |
| EP | 3786598 A1 | 3/2021 | | |
| WO | WO 2018/200541 A1 | 11/2018 | | |
| WO | WO 2019/161849 A1 | 8/2019 | | |

OTHER PUBLICATIONS

European Patent Office, Extended European Search Report in European Patent Application No. 21185574.7, 9 pp. (Dec. 3, 2021).

* cited by examiner

SYSTEM FOR MONITORING A DEVICE

CROSS-REFERENCE TO RELATED APPLICATIONS

This patent application claims priority to European Patent Application No. 21185574.7, filed on Jul. 14, 2021, which is incorporated herein in its entirety by reference.

FIELD OF THE DISCLOSURE

The present disclosure relates a system and method for monitoring a device.

BACKGROUND OF THE INVENTION

The temperature of a power device (for example, a low power, medium power or high voltage switchgear) needs to stay within device specific limits to avoid damage from thermal stress.

Temperature monitoring, for example using measurements with infrared (IR) sensors is used to control that these limits are adhered to. The measurement gives only information about the status of the temperature of a part of the device at the moment in time of the measurement. However, it is often required to understand how the temperature of that part will develop and whether the final temperature that will be reached will be problematic.

An example is the situation that a service task is accomplished, and the device is put back into operation. The device starts in this case from the temperature of the environment, and when the power is switched on it heats up. The highest temperature and thus the most critical situation is the stationary state that is reached after some time.

But, if a connection has not been correctly made, heating caused by current flow can be greater than it should be, leading to thermal stresses and potential damage.

However, it is not possible to determine if such a situation that could cause damage will develop.

BRIEF SUMMARY OF THE INVENTION

In a first aspect, there is provided a system for monitoring a device, the system comprising: a temperature sensor; a processing unit; and an output unit.

The temperature sensor is configured to acquire at least one temperature measurement of a component of the device during a heat-up phase of the component of the device. The temperature sensor is configured to provide the at least one temperature measurement to the processing unit. The processing unit is configured to select a simulated transient temperature distribution of the simulated component of the simulated device from a plurality of simulated transient temperature distributions of the simulated component of the simulated device. The plurality of simulated transient temperature distributions each relate to a different situation with respect to simulated heat-up phases of the simulated component of the simulated device. The selection of the simulated transient temperature distribution comprises a comparison of the at least one temperature measurement with the plurality of simulated transient temperature distributions at an equivalent time point in the simulated heat-up to a time point at which the temperature measurement was acquired. The processing unit is configured to determine that a hot spot is developing with respect to the component of the device. The determination comprises utilization of the selected simulated transient temperature distribution of the simulated component of the simulated device. The output unit is configured to output an indication of a fault associated with the component of the device on the basis of the determination that a hot spot is developing.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figure 1:
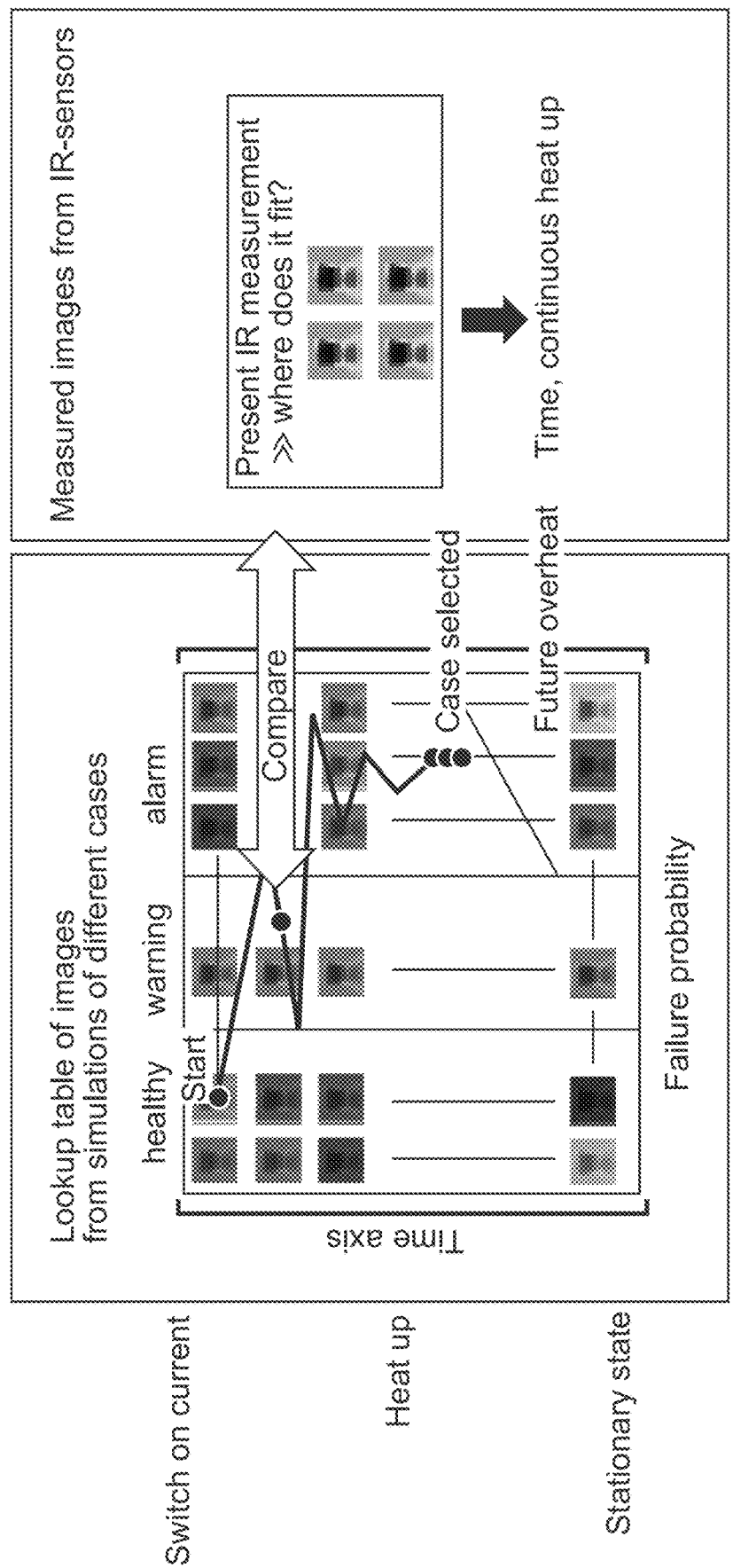
FIG. 1 shows a representation of monitoring of a device in accordance with the disclosure.
Figure 2:
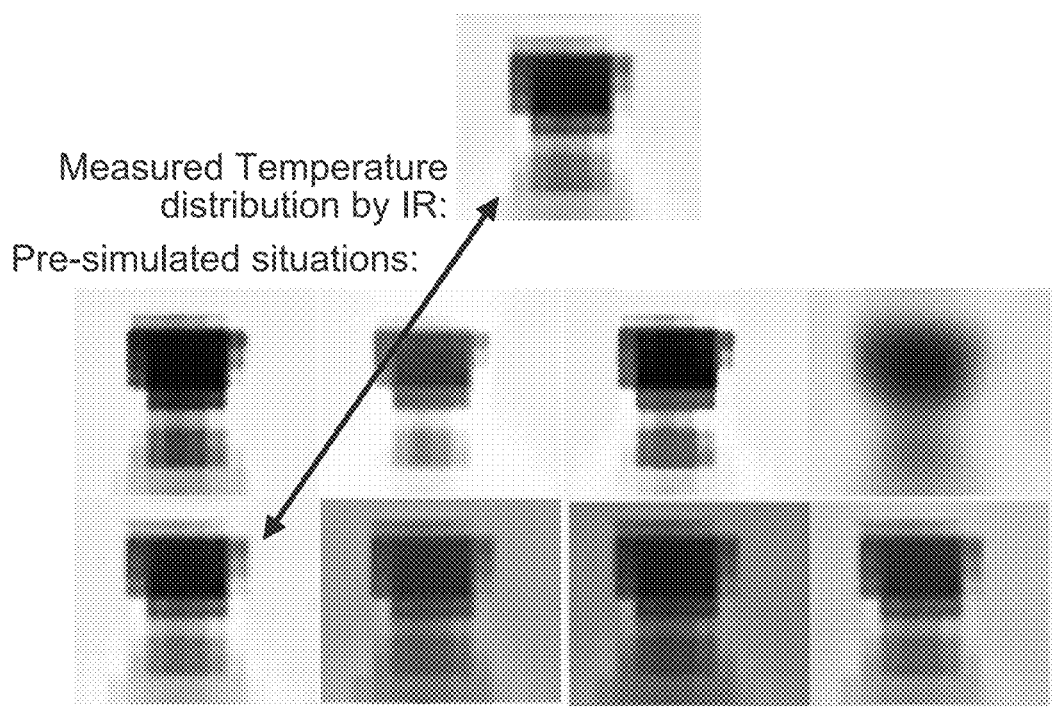
FIG. 2 shows a representation of a measured temperature distribution being used to select a simulated temperature distribution in accordance with the disclosure.

FIGS. 1-2 relate to a system for monitoring a device and to a method for monitoring a device.

In an example, the system for monitoring a device comprises a temperature sensor, a processing unit, and an output unit. The temperature sensor is configured to acquire at least one temperature measurement of a component of the device during a heat-up phase of the component of the device. The temperature sensor is configured to provide the at least one temperature measurement to the processing unit. The processing unit is configured to select a simulated transient temperature distribution of the simulated component of the simulated device from a plurality of simulated transient temperature distributions of the simulated component of the simulated device. The plurality of simulated transient temperature distributions each relate to a different situation with respect to simulated heat-up phases of the simulated component of the simulated device. The selection of the simulated transient temperature distribution of the simulated component of the simulated device from the plurality of simulated transient temperature distributions comprises a comparison of the at least one temperature measurement with the plurality of simulated transient temperature distributions at an equivalent time point in the simulated heat-up to a time point at which the temperature measurement was acquired. The processing unit is configured to determine that a hot spot is developing with respect to the component of the device. The determination of the hot spot development comprises utilization of the selected simulated transient temperature distribution of the simulated component of the simulated device. The output unit is configured to output an indication of a fault associated with the component of the device on the basis of the determination that a hot spot is developing.

According to an example, the temperature sensor is an infrared camera, Surface Acoustic Wave sensor, or RFID sensor.

According to an example, the plurality of simulated transient temperature distributions each relate to simulated heat-up beyond the heat-up phases of the simulated component of the simulated device for the different situations.

According to an example, the plurality of simulated transient temperature distributions each relate to simulated heat-up to a steady state of the simulated component of the simulated device for the different situations.

According to an example, the determination that the hot spot is developing with respect to the component of the device comprises an extrapolation of the selected simulated transient temperature distribution of the simulated component of the simulated device beyond the time point in the simulated heat-up equivalent to the time point at which the temperature measurement was acquired.

According to an example, the determination that the hot spot is developing with respect to the component of the device comprises an extrapolation of the selected simulated transient temperature distribution of the simulated component of the simulated device to a steady state of the simulated component.

According to an example, the at least one temperature measurement comprises a plurality of temperature measurements, and the plurality of temperature measurements were acquired at the same time. Thus, a temperature image can be acquired.

According to an example, the temperature sensor is the infrared camera, and the at least one temperature measurement comprises an infrared image of the component. The plurality of simulated transient temperature distributions each comprise a plurality of infrared images of the simulated component.

According to an example, the plurality of simulated transient temperature distributions are simulated in a process that comprises utilization of finite element analysis.

According to an example, the comparison of the at least one temperature measurement with the plurality of simulated transient temperature distributions comprises utilization of a matrix norm or a machine learning algorithm implemented by the processing unit.

According to an example, the system comprises a current sensor configured to measure current through the component. The selection of the simulated transient temperature distribution of the simulated component of the simulated device comprises utilization of the measured current through the component.

According to an example, the system comprises a an ambient air temperature sensor configured to measure an air or gas temperature in the vicinity of the component. The selection of the simulated transient temperature distribution of the simulated component of the simulated device comprises utilization of the measured air or gas temperature in the vicinity of the component.

According to an example, the device is a low, medium or high voltage switchgear.

The method for monitoring a device comprises:
a) acquiring by a temperature sensor at least one temperature measurement of a component of the device during a heat-up phase of the component of the device;
b) providing the at least one temperature measurement to a processing unit;
c) selecting by the processing unit a simulated transient temperature distribution of the simulated component of the simulated device from a plurality of simulated transient temperature distributions of the simulated component of the simulated device, wherein the plurality of simulated transient temperature distributions each relate to a different situation with respect to simulated heat-up phases of the simulated component of the simulated device, and wherein the selection comprises comparing the at least one temperature measurement with the plurality of simulated transient temperature distributions at an equivalent time point in the simulated heat-up to a time point at which the temperature measurement was acquired;
d) determining by the processing unit that a hot spot is developing with respect to the component of the device, and wherein the determining comprises utilizing the selected simulated transient temperature distribution of the simulated component of the simulated device; and
e) outputting by an output unit an indication of a fault associated with the component of the device on the basis of the determination that a hot spot is developing.

In an example, the temperature sensor is an infrared camera, Surface Acoustic Wave sensor, or RFID sensor.

In an example, the plurality of simulated transient temperature distributions each relate to simulated heat-up beyond the heat-up phases of the simulated component of the simulated device for the different situations.

In an example, the plurality of simulated transient temperature distributions each relate to simulated heat-up to a steady state of the simulated component of the simulated device for the different situations.

In an example, step d) comprises extrapolating the selected simulated transient temperature distribution of the simulated component of the simulated device beyond the time point in the simulated heat-up equivalent to the time point at which the temperature measurement was acquired.

In an example, step d) comprises extrapolating the selected simulated transient temperature distribution of the simulated component of the simulated device to a steady state of the simulated component.

In an example, the at least one temperature measurement comprises a plurality of temperature measurements, and wherein the plurality of temperature measurements were acquired at the same time.

In an example, the temperature sensor is the infrared camera, wherein the at least one temperature measurement comprises an infrared image of the component, and wherein the plurality of simulated transient temperature distributions each comprise a plurality of infrared images of the simulated component.

In an example, the plurality of simulated transient temperature distributions are simulated in a process that comprises utilization of finite element analysis.

In an example, in step c) the comparing the at least one temperature measurement with the plurality of simulated transient temperature distributions comprises utilization of a matrix norm or a machine learning algorithm implemented by the processing unit.

In an example, the method comprises measuring by a current sensor current through the component, and wherein the step c) comprises utilizing the measured current through the component.

In an example, the method comprises measuring by an ambient air temperature sensor an air or gas temperature in the vicinity of the component, and wherein step c) comprises utilizing the measured air or gas temperature in the vicinity of the component.

Thus, the new device monitoring technique enables a conclusion to be made as to the future temperature of a power device, or at least one or more components of the device. This is achieved in a specific example by measuring a temperature at an accessible point by a sensor, for example by an infrared camera or other sensing methods such as SAW, RFID. This measurement is then compared to transient electro-thermal simulations of a variety of situations. By corresponding the measurement to one of the pre-simulated situations, then the future temperature can just be looked up in the transient simulation of this situation. From the simulation it is known, when, and where the device eventually reaches a critical temperature. Thus the time to failure is known. Thus, once this correlation is known, it is possible to conclude the future temperature from the current sensor-measurement, because the correlated simulated measurement to which the real measurement has been shown to correspond can be progressed forward in time for the specific situation, and the temperature of the component determined into the future to assess if for example a hot spot will develop leading to a fault.

It was established that such a correlation can sometimes be derived from dedicated experiments during the product design phase. However, it was realized that such correlations are only known for the measured situations (e.g. for the electrical contact resistance of the experiment) and cannot be generalized to other situations or to other devices. Furthermore, such experiments take a lot of time and are costly. Also, the critical point with the highest temperature is experimentally not always accessible, not even in the design phase in the laboratory.

It was realized that instead of measurements, transient electro-thermal simulations (e.g. by Finite Elements FEM) can be used to enable the mentioned correlation between the measured temperature at the moment of measurement and the temperature in the future to be established.

Transient FEM simulations allow an analysis of the entire device over time and are not limited to the present time and accessible positions only. The situations can easily be varied. Thus, the desired correlation can be determined for a much larger number of different situations than with experiments. The devices can also easily be exchanged in the simulations. So once the simulation methodology is established it is far cheaper, more flexible, and more general than experiments to determine the desired correlation.

FIG. 1 shows an example of an overview of the new technique. This shows the comparison of the measurement of the sensor (right box) with a look-up table of pre-simulated situations (left box). Once a situation (case) is identified, it's clear from the simulations if, where, and when the device becomes overheated.

The novel monitoring system consists of the following elements:
1. A temperature measurement by a sensor
2. A series of pre-simulated transient FEM simulations of different situations
3. An algorithm to compare the measured temperature with the pre-simulated FEM simulations and to decide which of these situations corresponds to the measurement.

The measurement by the sensor results in a temperature distribution. In the case of an IR-camera it comprises an array of temperatures that corresponds to the number of pixels of the optics of the IR-camera.

The FEM simulations are transient coupled electro-thermal simulations. The ohmic losses are computed by solving the Maxwell equations. There are several options to compute the temperature in the thermal part of the simulation.

In a first option, either the simple heat-conduction equation is solved. The heat exchange with the environment can be estimated via heat-transfer coefficients at the surface of the device.

Alternatively, in a second option, a full CFD calculation can be conducted. This is more effort but is only necessary if convection and radiation cannot sufficiently precise be estimated via heat-transfer coefficients.

Several situations are then simulated corresponding to possible failure cases. Different situations can for example be different electric contact resistances. The temperature rises in a different way depending if the electrical contacts were properly closed e.g. after a service event, and the final stationary state temperature is also different. The different transient simulations of the situations can then be characterized by their failure probability, see the columns of the lookup table in FIG. 1. Some situations are uncritical, whilst others may lead to thermal damage.

During the heat-up the simulated transient temperature distributions are then compared to the measured temperature distributions by the sensor, see FIG. 2. This comparison could e.g. be done by a matrix norm, or by a machine learning algorithm.

FIG. 2 illustrates the measured and simulated temperature distributions. A comparison of each simulated case with the measured one is being carried out, and the best match is identified.

The best match of the pre-simulated situations with the measurement is then assumed to be the current state of the device. This state may not always correspond to the same situation (simulated case) during the entire heat-up, because at the beginning the temperatures of the different situations are similar. After some time however, the comparison should uniquely correspond to one situation (case). Then this case is selected, and the future temperature of the device can then be looked up in this simulation. It's then also clear if, when, and where the device eventually reaches a critical temperature. Thus the time to failure is known.

The look-up table may include additional information, e.g. data of other sensors. For example ambient air temperature in the compartments inside the switchgear or the current value in the phases may be included.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the temperature sensor is an infrared camera, Surface Acoustic Wave sensor (SAW), or RFID sensor.

In an example, the plurality of simulated transient temperature distributions each relate to simulated heat-up beyond the heat-up phases of the simulated component of the simulated device for the different situations. In other words, each of the simulated transient temperature distributions relate to simulated heat-up to times that are later than the heat up phases of the simulated component. In manner situations the time later than the heat-up phase can be considered to be a steady state phase, however a heat-up phase can in some situations be considered to be an initial heat-up phase followed by transition stage before a steady state is reached.

In an example, the plurality of simulated transient temperature distributions each relate to simulated heat-up to a steady state of the simulated component of the simulated device for the different situations.

In an example, the determination that the hot spot is developing with respect to the component of the device comprises an extrapolation of the selected simulated transient temperature distribution of the simulated component of the simulated device beyond the time point in the simulated heat-up equivalent to the time point at which the temperature measurement was acquired.

In an example, the determination that the hot spot is developing with respect to the component of the device comprises an extrapolation of the selected simulated transient temperature distribution of the simulated component of the simulated device to a steady state of the simulated component.

In an example, the at least one temperature measurement comprises a plurality of temperature measurements, and wherein the plurality of temperature measurements were acquired at the same time.

In an example, the temperature sensor is the infrared camera. The at least one temperature measurement comprises an infrared image of the component, and the plurality of simulated transient temperature distributions each comprise a plurality of infrared images of the simulated component.

In an example, the plurality of simulated transient temperature distributions are simulated in a process that comprises utilization of finite element analysis.

In an example, the comparison of the at least one temperature measurement with the plurality of simulated transient temperature distributions comprises utilization of a matrix norm or a machine learning algorithm implemented by the processing unit.

In an example, the system comprises a current sensor configured to measure current through the component. The selection of the simulated transient temperature distribution of the simulated component of the simulated device comprises utilization of the measured current through the component.

In an example, the system comprises a an ambient air temperature sensor configured to measure an air or gas temperature in the vicinity of the component. The selection of the simulated transient temperature distribution of the simulated component of the simulated device comprises utilization of the measured air or gas temperature in the vicinity of the component.

In an example, the device is a low, medium or high voltage switchgear.

In a second aspect, there is provided a method for monitoring a device, the method comprising:
a) acquiring by a temperature sensor at least one temperature measurement of a component of the device during a heat-up phase of the component of the device;
b) providing the at least one temperature measurement to a processing unit;
c) selecting by the processing unit a simulated transient temperature distribution of the simulated component of the simulated device from a plurality of simulated transient temperature distributions of the simulated component of the simulated device, wherein the plurality of simulated transient temperature distributions each relate to a different situation with respect to simulated heat-up phases of the simulated component of the simulated device, and wherein the selection comprises comparing the at least one temperature measurement with the plurality of simulated transient temperature distributions at an equivalent time point in the simulated heat-up to a time point at which the temperature measurement was acquired;
d) determining by the processing unit that a hot spot is developing with respect to the component of the device, and wherein the determining comprises utilizing the selected simulated transient temperature distribution of the simulated component of the simulated device; and
e) outputting by an output unit an indication of a fault associated with the component of the device on the basis of the determination that a hot spot is developing.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for monitoring a device, the system comprising:
a temperature sensor;
a processing unit;
a current sensor; and
an output unit;
wherein the temperature sensor is configured to acquire at least one temperature measurement of a component of the device during a heat-up phase of the component of the device;
wherein the temperature sensor is configured to provide the at least one temperature measurement to the processing unit;
wherein the current sensor is configured to measure current through the component;
wherein the processing unit is configured to select a simulated transient temperature distribution of the simulated component of the simulated device from a plurality of simulated transient temperature distributions of the simulated component of the simulated device, wherein the plurality of simulated transient temperature distributions each relate to a different situation with respect to simulated heat-up phases of the simulated component of the simulated device, and wherein the selection comprises a comparison of the at least one temperature measurement with the plurality of simulated transient temperature distributions at an equivalent time point in the simulated heat-up to a time point at which the temperature measurement was acquired, wherein the selection of the simulated transient temperature distribution of the simulated component of the simulated device comprises utilization of the measured current through the component;

wherein the processing unit is configured to determine that a hot spot is developing with respect to the component of the device, and wherein the determination comprises utilization of the selected simulated transient temperature distribution of the simulated component of the simulated device, wherein the determination that the hot spot is developing with respect to the component of the device comprises an extrapolation of the selected simulated transient temperature distribution of the simulated component of the simulated device beyond the time point in the simulated heat-up equivalent to the time point at which the temperature measurement was acquired; and wherein the output unit is configured to output an indication of a fault associated with the component of the device on the basis of the determination that a hot spot is developing.

2. The system according to claim 1, wherein the temperature sensor is an infrared camera, Surface Acoustic Wave sensor, or RFID sensor.

3. The system according to claim 1, wherein the plurality of simulated transient temperature distributions each relate to simulated heat-up beyond the heat-up phases of the simulated component of the simulated device for the different situations.

4. The system according to claim 3, wherein the plurality of simulated transient temperature distributions each relate to simulated heat-up to a steady state of the simulated component of the simulated device for the different situations.

5. The system according to claim 1, wherein the determination that the hot spot is developing with respect to the component of the device comprises an extrapolation of the selected simulated transient temperature distribution of the simulated component of the simulated device to a steady state of the simulated component.

6. The system according to claim 1, wherein the at least one temperature measurement comprises a plurality of temperature measurements, and wherein the plurality of temperature measurements were acquired at the same time.

7. The system according to claim 2, wherein the temperature sensor is the infrared camera, wherein the at least one temperature measurement comprises an infrared image of the component, and wherein the plurality of simulated transient temperature distributions each comprise a plurality of infrared images of the simulated component.

8. The system according to claim 1, wherein the plurality of simulated transient temperature distributions are simulated in a process that comprises utilization of finite element analysis.

9. The system according to claim 1, wherein the comparison of the at least one temperature measurement with the plurality of simulated transient temperature distributions comprises utilization of a matrix norm or a machine learning algorithm implemented by the processing unit.

10. The system according claim 1, wherein the system comprises a an ambient air temperature sensor configured to measure an air or gas temperature in the vicinity of the component, and wherein the selection of the simulated transient temperature distribution of the simulated component of the simulated device comprises utilization of the measured air or gas temperature in the vicinity of the component.

11. The system according to claim 1, wherein the device is a low, medium or high voltage switchgear.

12. A method for monitoring a device, the method comprising:
a) acquiring by a temperature sensor at least one temperature measurement of a component of the device and measuring by a current sensor current through the component during a heat-up phase of the component of the device;
b) providing the at least one temperature measurement and measured current through the component to a processing unit;
c) selecting by the processing unit a simulated transient temperature distribution of the simulated component of the simulated device from a plurality of simulated transient temperature distributions of the simulated component of the simulated device, wherein the plurality of simulated transient temperature distributions each relate to a different situation with respect to simulated heat-up phases of the simulated component of the simulated device, and wherein the selection comprises comparing the at least one temperature measurement with the plurality of simulated transient temperature distributions at an equivalent time point in the simulated heat-up to a time point at which the temperature measurement was acquired, and the selection comprises utilizing the measured current through the component;
d) determining by the processing unit that a hot spot is developing with respect to the component of the device, and wherein the determining comprises utilizing the selected simulated transient temperature distribution of the simulated component of the simulated device and the determining comprises extrapolating the selected simulated transient temperature distribution of the simulated component of the simulated device beyond the time point in the simulated heat-up equivalent to the time point at which the temperature measurement was acquired; and
e) outputting by an output unit an indication of a fault associated with the component of the device on the basis of the determination that a hot spot is developing.

* * * * *